Aug. 15, 1967  SHIGEMI IMAI  3,335,472
SNAP HOOK
Filed March 25, 1966
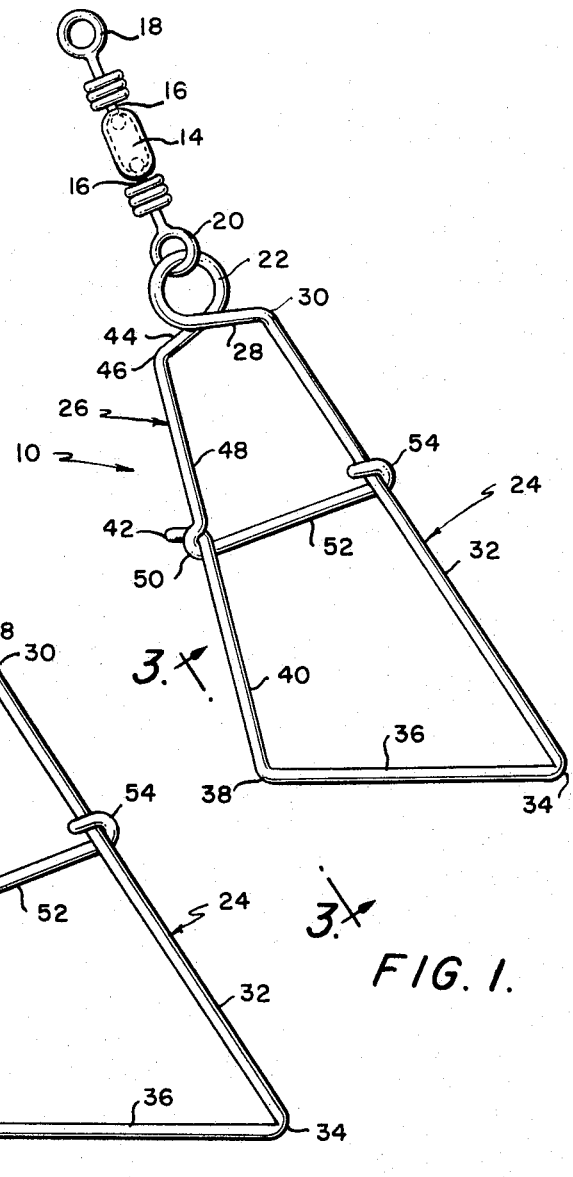
FIG. 4.
FIG. 1.
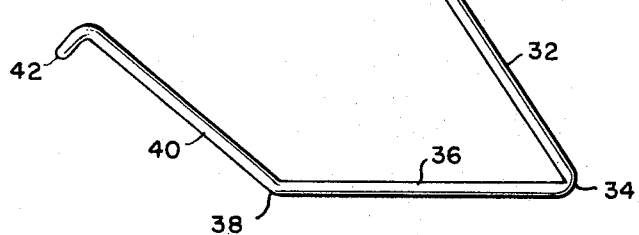
FIG. 2.
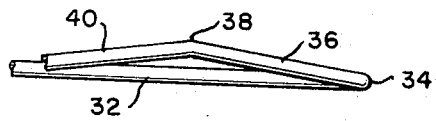
FIG. 3.
INVENTOR.
SHIGEMI IMAI
BY Jacobi & Davidson
ATTORNEYS United States Patent Office 3,335,472
Patented Aug. 15, 1967

3,335,472
SNAP HOOK
Shigemi Imai, 8 1-chome, Kumochibashi Dori,
Fukiai-ku, Kobe, Japan
Filed Mar. 25, 1966, Ser. No. 537,567
7 Claims. (Cl. 24—237)

This invention relates generally to fastening devices, and in particular it relates to a new and improved snap hook which finds particular utility in the field of fishing.

It is well known that during a period of fishing, the fisherman must once or several times change the hook, fly or lure until he arrives at a satisfactory one. Although such hooks, flies and lures have small eyes formed at the top thereof, to facilitate attachment, if the fishing line itself is threaded through these eyes and then knotted, such line must be cut and rethreaded each time it is desired to change lures. Since this is a cumbersome and time-consuming operation, requiring careful manipulation, more and more fishermen have been turning to the use of a fastening device of the general type disclosed in the present invention.

Devices of this type have become known in the art as "snap hooks" or "snap fasteners," and in general, such devices have an eye for attachment to the fishing line itself, and a clasp or hook which can be opened, if desired, to receive the eye of the hook, fly or lure, and to thereby couple the same removably with the fishing line. While snap hook devices of this type have been known and used for some time, the particular construction of these prior art forms of snap hooks has not been entirely satisfactory. For example, some prior art snap hooks were quite difficult to open and close, thereby eliminating most of the convenience which the snap hook was intended to provide. Other prior art snap hooks because of weak or unsatisfactory construction, tended to open during a casting operation, or when a fish struck at the hook, and if this occurred, the fisherman not only lost the fish but generally lost the hook, fly, or lure, which he was using. Still other prior art forms of snap hooks were somewhat complicated in construction, thereby making the same difficult to manufacture on any production scale, and thus causing the same to be inordinately expensive.

With the foregoing matter in mind, it is, therefore, an object of the present invention to overcome the difficulties and deficiencies associated with prior art forms of snap hooks, and to provide in their stead, a new and improved snap hook.

Another object of the present invention is to provide a snap hook which is easy to manufacture and which can be readily produced on a mass-production basis at relatively inexpensive cost.

Another object of the present invention is to provide a snap hook which will normally remain in its closed position, and which will not inadvertently open during any normal fishing operation, yet which can be readily manipulated by the operator to an opened position, when desired.

Another object of the present invention is to provide a snap hook which is simple in construction, yet which possesses the necessary attributes of strength and rigidity to accomplish its desired purposes.

Other objects, advantages and salient features of the present invention will become apparent from the following detailed description, which, taken in conjunction with the annexed drawing, discloses a preferred embodiment thereof.

Referring to the drawing:

FIGURE 1 is a perspective view of the snap hook of the present invention, showing the same in a closed position and attached to a swivel coupling;

FIGURE 2 is a perspective view of the snap hook in an opened condition;

FIGURE 3 is a fragmentary side elevational view looking in the direction of the arrows 3—3 of FIGURE 1; and FIGURE 4 is a fragmentary sectional view through the swivel coupling means shown in FIGURE 1.

In accordance with the principles of the present invention, there is provided a new and improved snap hook generally designated 10. Such snap hook, as shown in FIGURE 1, is intended for attachment with a swivel coupling means generally designated 12. Such swivel coupling means includes a hollow body member 14, having a pair of freely pivotable hangers 16, 16 extending in opposite directions therefrom. The hangers 16 connect to hook-eye means 18 and 20. The hook-eye means 18 is intended for attachement with a conventional fishing line, while the hook-eye 20 is intended for attachment with the snap hook of the present invention. Since the hangers 16, 16 are freely pivotable with respect to one another, as the same are mounted within the body 14, the overall result is that rotational or pivotal movement of the snap hook 10 will not be transmitted to the hook eye 18 or the attached fishing line, and thus the line will not become twisted or tangled.

Considering now the snap hook itself, it will be seen that the same is fabricated of a single length of wire, preferably fabricated of steel or the like. The wire itself is formed into a rounded eye means 22 which connects with the hook-eye 20 on the swivel means 12. From the eye means 22, the single length of wire continues forwardly and forms a pair of extension portions. One such extension portion, generally designated 24, is of a generally U-shaped configuration. The other extension portion, generally designated 26, is of a generally L-shaped configuration.

Considering first the U-shaped portion 24, it will be seen that the rounded eye means includes an overlapping portion of the wire 28 which extends to a corner 30, and then abruptly changes direction. That portion of the wire extending beyond the corner 30 forms the U-shaped portion. As such, it includes a first elongated forwardly extending leg portion 32, which, at a corner 34, merges sharply into a sidewardly extending second leg portion 36. This second leg portion 36 continues to a corner 38, then merges into a rearwardly extending third leg portion 40. The third leg portion 40 terminates in a hook end 42.

Considering again the rounded eye means 22, the same includes an underlapping wire portion 44 which extends beneath the wire portion 28 and which extends to a corner 46. The L-shaped portion 26 extends from the corner 46 and includes a first forwardly extending arm portion 48 which extends to an enlarged corner portion 50 whereat it joins with a second arm portion 52 which extends sidewardly across the snap hook 10 and joins with the first leg portion 32. Such joining is preferably accomplished by a bent hooked end 54.

As can best be seen in FIGURE 1, but more clearly in FIGURE 3, the second leg portion 36 extends obliquely between the first and third leg portions. More particularly, the same preferably angles upwardly somewhat, in the manner shown in FIGURE 3, and the third leg portion 40 connected therewith at the corner 38 angles back downwardly. The overall result is that the angle subtended at the corner 34, between the leg portions 32 and 36, is an acute angle when the snap hook is in the closed position of FIGURE 1.

To place the snap hook 10 in its closed position of FIGURE 1, the hook end 42 on the third leg portion 40 is inserted into the corner 50 between the first and second arm portions. It will, of course, be understood that the wire from which the snap hook of the present invention is formed has a high degree of resilience, and that once such wire is twisted into the rounded eye 22 and is then bent at the corners 30 and 46, the inherent resiliency of the wire tends to make the same want to return to its original straight condition. Thus, the first leg portion 32 has a tendency to spring outwardly, and the same is true of the first arm portion 48. Although the resiliency of the wire tends to move the portions 32 and 48 oppositely from one another, such movement is prevented by the second arm portion 52 which interconnects the two. Accordingly, the first leg portion 32 always remains tightly engaged and forced against the hook end 54 on the second arm portion 52.

In addition to the foregoing, the resiliency of the wire tends to normally cause a straightening effect at the corners 34 and 38. This can be more clearly understood by reference to FIGURE 2 wherein the snap hook 10 is shown in its opened position. In such opened position, it will be noted that the size of the angle subtended between the leg portions 32 and 36 is greatly increased, and the same is true of the angle subtended between the leg portions 36 and 40.

Now, assuming that it is desired to use the snap hook, the same is opened as shown in FIGURE 2, and a fish hook, fly or lure is attached thereto by slipping the hook eye thereof over the hook end 42 and down along the third arm portion 40. Then, the user manually grasps the third leg portion 40 and moves the same upwardly and inwardly to engage the hook end 42 thereof in the corner 50 of the L-shaped portion 26. When the hook end 42 is so engaged in the corner, the resilience or spring force of the wire tends to maintain the same tightly therewithin and the snap hook 10 cannot inadvertently open. If one considers that the outer end of the U-shaped portion 24 is formed at the second leg portion 36 and that the inner end thereof is formed at the second arm portion 52, it will be appreciated that because the second arm portion 52 is shorter than the second leg portion 36, the inner end of the U-shaped portion is narrower than the outer end thereof. As a result, there is a strong force acting on the third leg portion 40 tending to move the same outwardly, and this force tightly engages the hook end 42 in the corner 50. Additionally, the second leg portion 36 has an outward or forward force acting thereupon, tending to increase the subtended angle at the corner 34, and this force creates a downward pull on the third leg portion 40. This is an additional force which tends to keep the hook end 42 tightly engaged in the corner 50.

The overall result of the forces acting upon the second and third leg portions is such that, once the snap hook is closed, the same will remain closed because the hook end 42 will be very tightly engaged in the corner 50. However, when it is desired to open the snap hook, this can be accomplished merely by the application of digital pressure against the third leg portion 40, thereby releasing or disengaging the hook end 42 from the corner 50. When this occurs, the snap hook will assume the opened position shown in FIGURE 2.

After reading the foregoing detailed description, it should be apparent that the objects set forth at the outset of the specification have been successfully achieved by the present invention.

What is claimed is:
1. A snap hook comprising:
   a single length of resilient wire formed into a rounded eye means and then continuing forwardly into a pair of extension portions;
   one of said extension portions being generally U-shaped and terminating in a hook end;
   the other of said extension portions being generally L-shaped and hence including a corner;
   the end of said L-shaped portion being joined to said U-shaped portion;
   said hook end being releasably engageable in said corner and being retained therein by the resilience of said wire, thereby maintaining said snap hook in closed position;
   said hook end being releasable from said corner by manual squeezing of said U-shaped portion to thereby open said snap hook.
2. A snap hook as defined in claim 1 wherein said U-shaped portion includes a first elongated leg portion extending forwardly from said eye means, a second leg portion extending sidewardly from said first portion and a third leg portion extending rearwardly from said second leg portion, said hook end being provided at the end of said third leg portion.
3. A snap hook as defined in claim 2 wherein said L-shaped portion includes a first arm portion extending forwardly from said eye means and a second arm portion extending sidewardly therefrom, said corner being formed at the juncture of said first and second arm portions.
4. A snap hook as defined in claim 3 wherein said first arm portion is shorter than said first leg portion and wherein the end of said second arm portion is joined with said first leg portion, thus joining said L-shaped portion with said U-shaped portion.
5. A snap hook as defined in claim 4 wherein the outer end of said U-shaped portion is formed by said second leg portion and wherein the inner end of said U-shaped portion is formed by said second arm portion, said second arm portion being shorter than said second leg portion thus making its inner end narrower than said outer end when said hook end is engaged in said corner.
6. A snap hook as defined in claim 2 wherein said second leg portion extends obliquely from said third leg portion to said first leg portion.
7. A snap hook as defined in claim 2 wherein the juncture of said first and second leg portions forms an acute angle, when said hook end is engaged in said corner.

References Cited

UNITED STATES PATENTS

| 1,004,324 | 9/1911 | Wickman et al. | |
| 1,231,742 | 7/1917 | Hurlbut | 24—237 |
| 2,219,983 | 10/1940 | Evenson | 24—236 X |
| 2,354,848 | 8/1944 | Carpenter | 24—161 |

WILLIAM FELDMAN, *Primary Examiner.*

DONALD A. GRIFFIN, *Examiner.*